United States Patent [19]
Roberts et al.

[11] 4,099,687
[45] Jul. 11, 1978

[54] ALL-AXIS CONTROL OF AIRCRAFT IN DEEP STALL

[76] Inventors: Lawrence T. Roberts, 1634 A Des Moines Rd., Kent, Wash. 98031; Thomas H. Strom, 605 Tam-O-Shanter Blvd., Williamsburg, Va. 23185

[21] Appl. No.: 707,789

[22] Filed: Jul. 22, 1976
(Under 37 CFR 1.47)

[51] Int. Cl.² .................... B64C 27/28; B64C 19/00
[52] U.S. Cl. ................................ 244/7 R; 244/87; 244/213
[58] Field of Search ............... 244/7 B, 7 C, 82, 87, 244/56, 12.4, 42 D, 213, 7 R

[56] References Cited

U.S. PATENT DOCUMENTS

| | | | |
|---|---|---|---|
| 1,533,323 | 4/1925 | McCauley | 244/87 X |
| 1,964,418 | 6/1934 | Alfaro | 244/42 D |
| 2,045,638 | 6/1936 | Dormoy | 244/87 X |
| 2,067,634 | 1/1937 | Hafner | 244/87 X |
| 2,563,757 | 8/1951 | Thorp | 244/87 |
| 3,138,353 | 6/1964 | Steiner | 244/87 |
| 3,284,027 | 11/1966 | Mesniere | 244/12.4 |

Primary Examiner—Barry L. Kelmachter
Attorney, Agent, or Firm—Fidelman, Wolffe & Waldron

[57] ABSTRACT

Tilting the stabilizer at an extreme angle to the fuselage, with leading edge down, and varying engine thrust comprise a method for all-axis control of a generally conventional aircraft in deep stall. In an alternative embodiment, tilting the engines upward at an extreme angle to the fuselage and varying engine thrust comprise a method for all-axis control in deep stall.

5 Claims, 9 Drawing Figures

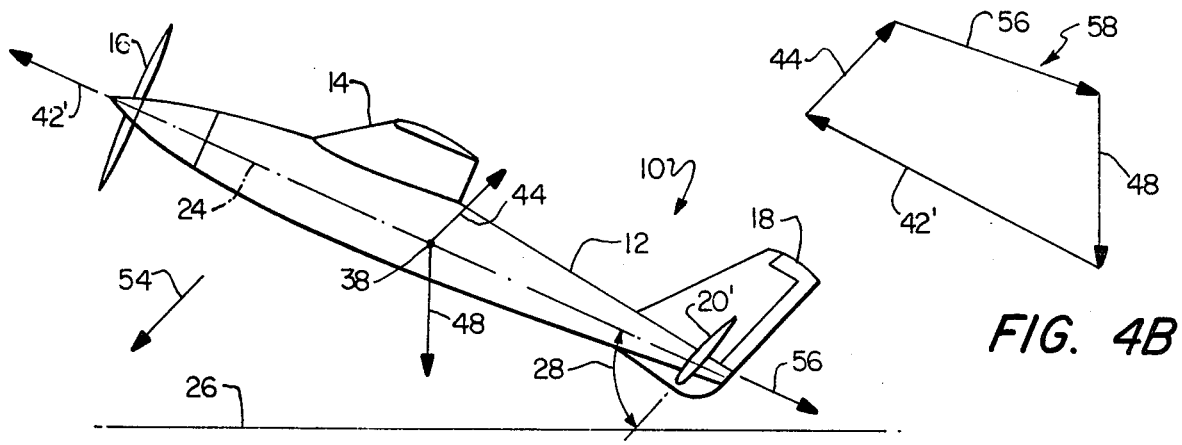
FIG. 4A
FIG. 4B
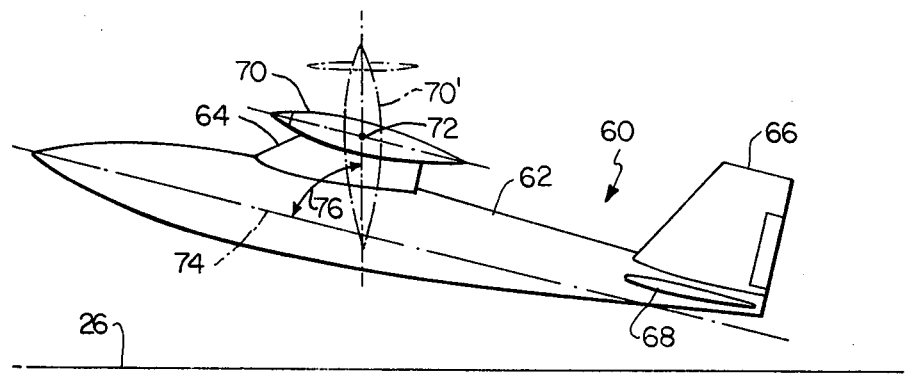
FIG. 5
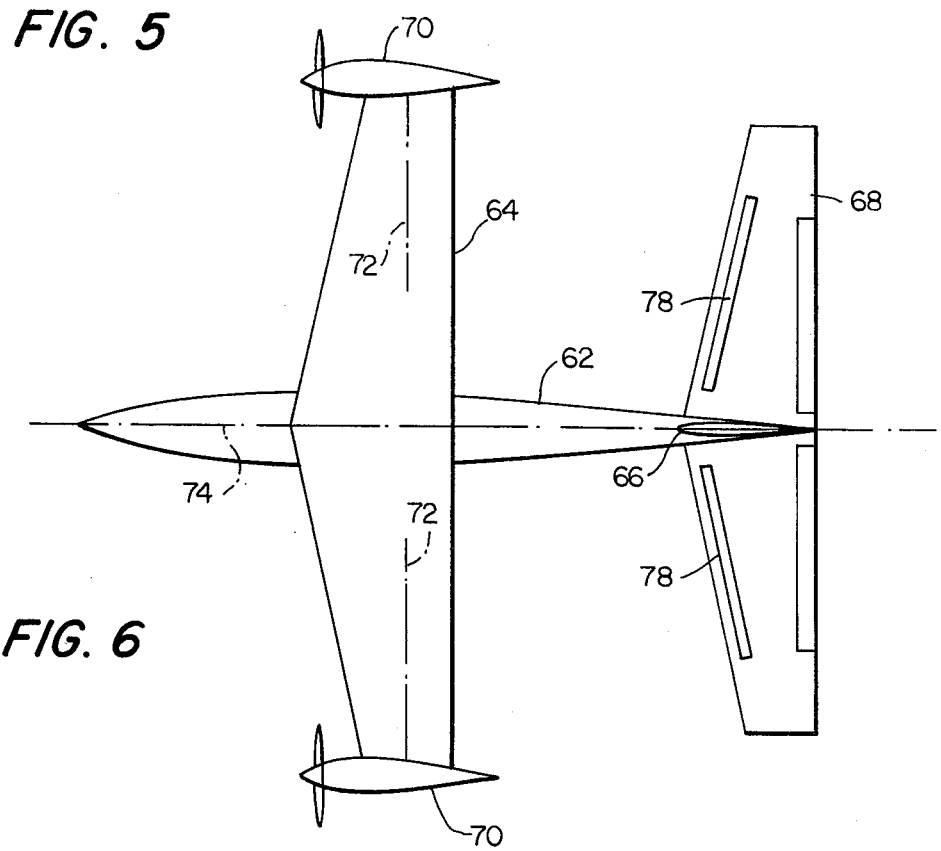
FIG. 6

ALL-AXIS CONTROL OF AIRCRAFT IN DEEP STALL

BACKGROUND OF THE INVENTION

This invention relates to fixed wing aircraft and, more particularly, to the configuration and method for controlling the flight of aircraft when the primary lifting surface is in deep stall.

It has generally been considered undesirable in normal operation of fixed wing aircraft to operate in deep stall. This condition occurs when the primary lifting surface, the wing, is at so positive an angle relative to the oncoming air flow, that flow line separation occurs along the entire upper wing surface and lifting force is lost. The result of such deep stall is generally an uncontrollable drop in attitude of the aircraft's nose section. Control is not regained except as air speed is increased by advancing engine thrust and by an accelerating drop in altitude.

Under the low speed and low altitude conditions of landing, where high wing lift is necessarily produced by flying close to wing stall conditions, the unintended incidence or inducement of deep stall might leave little time or room for recovery of control with damaging consequences. The seriousness of the problem is intensified when landings are required on short runways or over undeveloped landing areas.

Prior art has concerned itself with the role played by the tail surfaces, notably the stabilizer, in efficiently developing the highly positive angle of incidence required of the wing in low-speed flight conditions. The downward force generated at the rear of the fuselage by the stabilizer is used to rotate the aircraft to the wing's maximum unstalled angle of attack. On conventional airplanes having substantially horizontal stablizers, the downward thrust of the tail section is developed by upwardly tilting the elevator flaps hinged to the rear of the fixed stabilizer surface. However, in this slightly nose-up position of the airplane, the raised elevator flaps cause a downward thrust while, concurrently, the horizontal stabilizer section fixed in relation to the fuselage, generates increased lift (as compared to level flight) in opposition to the raised flaps. To overcome this inefficiency of opposed forces and to increase the down thrust while using smaller tail surfaces, fully tiltable stabilizers have been developed where the entire stabilizer surface rotates leading edge down, relative to the level flight axis of the fuselage. U.S. Pat. Nos. 2,563,757; 2,719,014; and 3,138,353 are illustrative of prior art utilizing tiltable stabilizer surfaces for the double purposes to more efficiently provide downward thrust at the rear of the fuselage and to simultaneously prevent the occurrence of deep stall in an aircraft flying at a low speeds.

Further, the desirability to use small or undeveloped landing zones has led to the development of aircraft capable of vertical takeoff and landing (VTOL). To achieve the VTOL feature and still retain relatively high performance in level flight, aircraft have been developed whereon the wing, or major portions thereof; engines; and, in some designs, the entire stabilizer surface are tiltable in the direction of flight. These elements are vertical for landing and takeoff and are horizontal in level flight as illustrated, for example, in U.S. Pat. No. 2,621,001. However, the stabilizer surface tilts with trailing edge down unlike the above-described fixed wing airplanes.

The VTOL airplane with tilting wing and engines suffers from the complexities of a dual purpose design and performance compromises which inevitably occur in attempting to satisfy two such diverse requirements as vertical and level flight. On the other hand, the more conventional fixed engine-fixed wing airplane with tiltable stabilizer surface preserves level flight performance and provides efficient aircraft control during low speed landings over shortened distances but does fall far short of effecting a vertical landing or nearly so. What is needed is a substantially conventional airplane having essentially normal level flight performance and combined with a capability of controlled landings which are vertical or substantially vertical.

SUMMARY OF INVENTION

The instant invention comprises the method of flying a generally conventional airplane having a fixed wing and a fully tiltable stabilizer so that completely controlled and substantially vertical descent is accomplished while the fuselage of the airplane is maintained in an orientation similar to level flight. The objective of control is accomplished by fully stalling the main lift surface, i.e., the wing, of the airplane and compensating for the lost wing-lift by a programmed variation of stabilizer lift and engine thrust.

In another application, the method of this invention controls a generally conventional airplane having tiltable engine nacelles mounted on a fixed wing so that completely controlled and substantially vertical descent is accomplished while the wing is in deep stall and the fuselage of the airplane is maintained in an orientation similar to level flight.

OBJECTS OF THE INVENTION

Therefore, it is an object of this invention to provide a method of controlling a generally conventional aircraft having a tiltable stabilizer in a substantially vertical descent while maintaining the fuselage at a desirable attitude to the horizontal.

Another object of this invention is to provide a method of controlling a generally conventional aircraft having a tiltable stabilizer when the primary lifting surface is in a continuous deep stall condition.

A further object of this invention is to provide a method of controlling a generally conventional aircraft having tiltable engine nacelles in a substantially vertical descent while maintaining the fuselage at a desirable attitude to the horizontal.

Still another object of this invention is to provide a method of controlling a generally conventional aircraft having tiltable engine nacelles when the primary lifting surface is in a continuous deep stall condition.

Other objects, advantages, and novel features of the present invention will become apparent from the following detailed description of the invention when considered in conjunction with the accompanying drawing in which:

FIG. 1 is a somewhat schematic side elevation view of an airplane having a tiltable stabilizer.

FIG. 2a and b are simplified vector diagrams of forces acting on the airplane of FIG. 1 during conventional landing.

FIGS. 3a and b are simplified vector diagrams of forces acting on the airplane of FIG. 1 during an uncontrolled deep stall descent.

FIGS. 4a and b are simplified vector diagrams of forces acting on the airplane of FIG. 1 during a controlled deep stall descent.

FIG. 5 is a somewhat schematic side elevation of an airplane having tiltable engine nacelles attached to the wing tips.

FIG. 6 is a top view of the airplane of FIG. 5.

DESCRIPTION OF THE INVENTION

Figure 1:
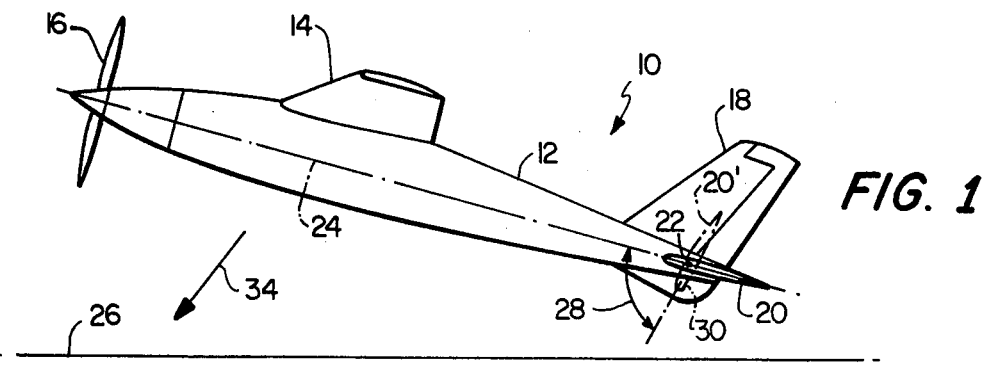

As illustrated in FIG. 1, an airplane 10 suitable for control by the method of this invention is comprised of a fuselage 12; a fixed wing 14, which is the craft's primary lifting surface; an engine 16 providing forward thrust; and a vertical rudder surface 18. The stabilizer 20 is horizontal airfoil surface attached pivotally on a horizontal axis 22 at the rear of the fuselage 12 so that the stabilizer 20 can be oriented with its chord line above or below the longitudinal axis 24 of the fuselage 12 as required for normal pitch control during flight. Additionally, the stabilizer 20 is capable of extreme tilting, with the leading edge of the stabilizer 20 downward, to angles at least as great as 65° away from alignment with the fuselage axis 24. Means to tilt the stabilizer 20 are well known, form no part of the present invention, and therefore are not described herein.

The airplane 10 of FIG. 1, with the stabilizer generally parallel to the fuselage axis 24, is capable of conventional landings, takeoff and flying maneuvers. However, by utilization of the method of this invention as described hereinafter, the airplane 10 is capable of a controlled low velocity descent at angles approaching the vertical, while simultaneously maintaining, the fuselage 12 in a desirable flight attitude, i.e., slightly nose-up from the horizontal 26 (FIG. 1).

To initiate the desired steep descent, the flying speed of the aircraft 10 is first reduced by decreasing engine thrust to an air speed just above stall conditions. Then by lowering the leading edge of the stabilizer 20, the nose of the aircraft 10 is slowly pulled up above the horizontal 26 until the wing 14 of the aircraft 10 begins to stall. Next, the horizontal stabilizer 20 is tilted at an angle 28 to the fuselage axis 24 between approximately 65° and 80°, with the leading edge 30 of the stabilizer 20' down relative to the trailing edge. (The prime marking (') denotes the stabilizer in its extremely tilted orientation.) Tilt actuation of the stabilizer 20' causes sufficient additional upward pitch to the wing 14 to bring about complete, deep stall of the wing surface. But as the airplane 10 descends in the direction of the arrow 34, the stabilizer surface 20' at the extreme angle 28 is unstalled in the relative air stream and provides stable control for the aircraft 10 in all axes. As the aircraft 10 starts its nearly vertical descent, engine power is increased to compensate for lift which is lost when the wing 14 is stalled and to hold the nose of the airplane 10 above the horizontal attitude 26. Thus, a slow, stable, and nearly vertical descent path 34 is maintained. The thrust of the engine 16 may be varied to control the actual rate of descent and the airplane 10 can be steered in the usual manner by operation of the rudder 18.

Although it is not known by exactly what mechanism all-axis stability is maintained during descent of the craft 10 with its main lifting surface 14 in deep stall, several theories offer logical bases upon which such performance may be anticipated. FIGS. 2-4 present a simplified vectorial analysis of forces acting upon the aircraft 10 of FIG. 1 in several stages of flight. Corresponding parts of the airplane bear similar numbers in all FIGS. 1-4.

Figure 2A:
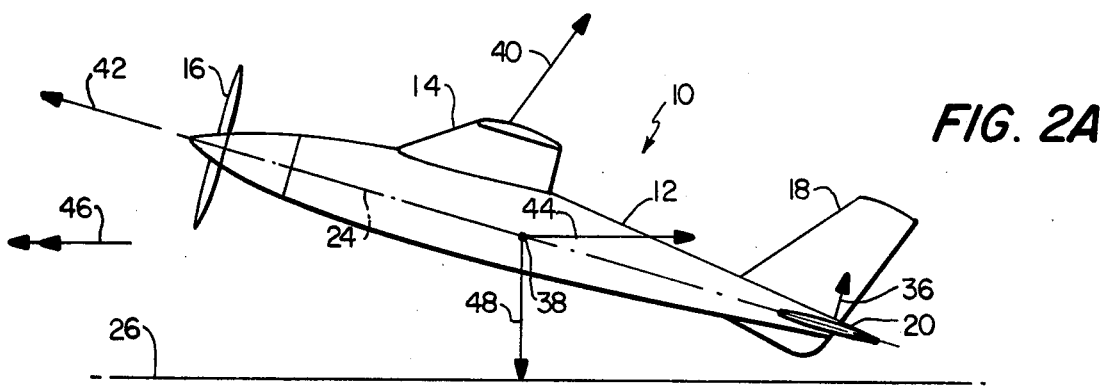
Figure 3B:
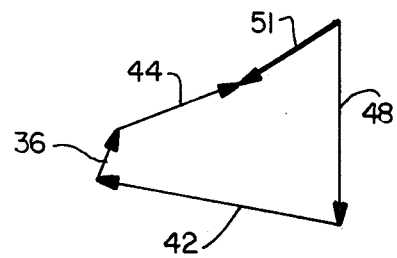
Figure 3A:
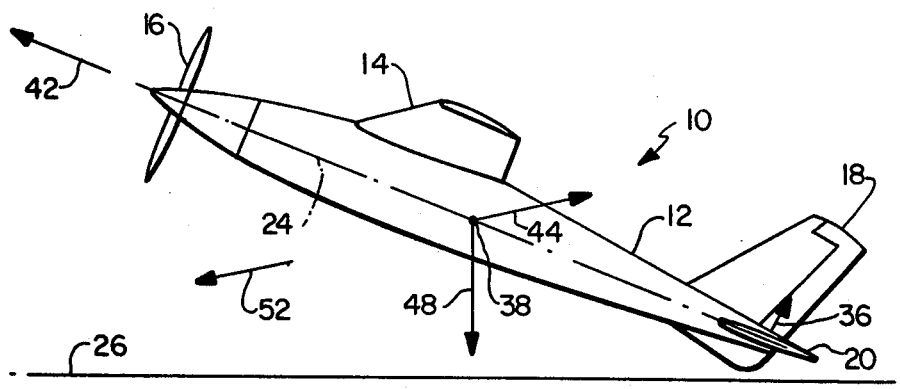

FIG. 2a illustrates the airplane 10 in generally horizontal flight at low speed prior to a conventional landing maneuver. The stabilizer surface 20 is tilted slightly below its normal angle relative to the axis 24 of the fuselage 12 producing diminished lift 36 at the tail. This pivots the fuselage 12 about its center of gravity 38 to a somewhat nose up attitude. The net force 36 on the stabilizer 20 is upward as a result of the high velocity air flow from the engine and the forward motion of the airplane. The wing 14, not yet stalled, produces lift 40 upward and generally perpendicular to the wing chord; and the thrust 42 of the engine 16 is forward and parallels the axis 24 of the fuselage 12. The net drag of the airplane is shown as a force 44 acting through the center of gravity 38 in a direction opposite to the path of travel of the aircraft which path is generally horizontal as indicated by the arrow 46. The weight 48 of the aircraft is shown vectorially acting vertically downward through the center of gravity 38.

Figure 2B:
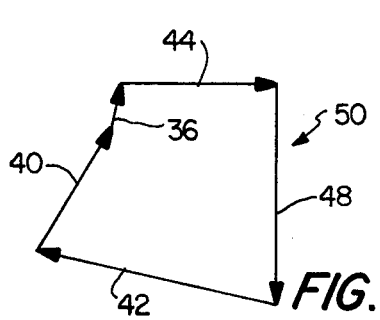

A summation of these vectorial forces, FIG. 2b, can produce a closed polygon 50 indicative of horizontally and vertically stable flight. Also, the counterbalancing moments of wing lift 40 and stabilizer lift 36 acting on opposite sides of the center of gravity 38 can provide pitch stability. Thus, by proper balancing of these forces, stable flight can be maintained at low speed with the primary lifting surface 14 near stall.

When the wing 14 is pivoted to a greater angle of attack, deep stall of the wing surface 14 occurs. Wing lift vanishes (FIG. 3a) and the vertical forces are unbalanced (FIG. 3b) leaving a resultant force 51 which causes the plane 10 to lose altitude as indicated by the arrow 52. Stabilizer lift force 36 persists and perhaps increases due to a more positive angle of incidence relative to the air stream as the plane 10 descends. Thus, the tail rises unopposed by a counterbalancing wing lift force and, pivoting about the center of gravity 38, the nose of the airplane 10 falls. This unstable pattern of stall followed by a dipping of the nose is well known in conventional aircraft.

FIG. 4a illustrates the effect of extreme rotation of the stabilizer surface 20' leading edge downward, as prescribed in the method of this invention. This operation of the stabilizer 20' is completed to convert a near-stall condition (as in FIG. 2) into deep stall of the wing 14 and thereby eliminates the lift force normally produced by the wing 14. Please see FIG. 4a. The plane 10 commences its descent in the direction as indicated by the arrow 54. As before, the weight force 48 acts vertically downward through the center of gravity 38; and the net drag force 44 acts upward and rearward opposite to the direction 54 of travel of the aircraft.

However, the force 56 produced by the extremely tilted stabilizer 20' is acting downwardly and rearwardly; first, because the air stream from the engine 16 impinges on the upper stabilizer surface 20' rather than passing over it; and secondly, because the stabilizer surface 20' now has a negative angle of attack relative to the direction 54 of the aircraft's travel. Either force alone might be sufficient to produce the downward force 56.

It is shown in FIG. 4b that these forces, when combined vectorially, can produce a closed polygon 58 indicating vertical and horizontal stability of the craft 10.

The angle 28 of the stabilizer surface 20' and thus the magnitude and direction of force it produces are controllable. Also engine thrust 42' is controllable and is increased to overcome the increased tail drag. So by manipulation of these forces, the operator can in effect close the force polygon 58 and provide vertical and horizontal stability as the plane moves along its downward path 54. All forces act substantially through the center of gravity 38 of the aircraft 10 thus providing pitch stability as well.

Another theory of operation holds that the aircraft in deep stall is trapped in its own vortex and held in the normal upright altitude. The rate of descent is low due to the resulting high drag of the craft and the lift created over the surfaces by the vortex flow.

FIGS. 5 and 6 illustrate another type of aircraft 60 suitable for control by the method of this invention. The aircraft 60 is comprised of a fuselage 62, a fixed wing 64 which is the primary lift surface, a vertical rudder surface 66 and a stabilizer surface 68. A pair of engine nacelles 70 are pivotably mounted at opposite wing tips to rotate in a vertical plane about a substantially horizontal axis 72. In conventional flight, the engines 70 are aligned to provide forward thrust substantially parallel to the axis 74 of the fuselage 62; and when pivoted at an extreme angle 76 to the fuselage axis 74, the pivoted engines, shown with broken lines in FIG. 5 and identified by the numeral 70', provide an upward thrust. Means to tilt engines are well known, form no part of the present invention, and therefore are not described herein.

The airplane of FIGS. 5 and 6 with engine thrust generally parallel to the fuselage axis 74 is capable of conventional takeoff, landing and flying maneuvers. However, by utilization of the method of this invention and described hereinafter, the airplane 60 is capable of a controlled low velocity descent at angles approaching the vertical while simultaneously maintaining the fuselage 62 in a desirable, slightly nose-up attitude from the horizontal 26 (FIG 5).

In initiating the desired steep descent, the flying speed of the aircraft is reduced by decreasing engine thrust to an airspeed just above stall conditions. Then the aircraft nose is pulled up in the conventional manner to initiate stall of the wing 64. Spoilers 78 on the stabilizer 68 are actuated to cause the stabilizer to stall. Loss of lift from the stabilizer 68 causes the tail to drop, further raising the airplane's nose. This induces deep stall of the wing 64; and lacking lift from both wing and stabilizer, the airplane 60 translates downward through a near vertical trajectory. At this time, the engine nacelles 70 are pivoted to the upward pointing position, approximately 80° off the normal line of thrust; and engine thrust is increased or decreased to control the rate of descent. A near-hover condition with attendant soft touchdown is feasible; and conventional steering capability using the rudder 66 continues during descent.

Operation of the system can be manual, remote or programmed to set either type aircraft into the required pre-stall attitude and to actuate the stabilizer or engine nacelle pivoting mechanism as the aircraft requires in order to initiate deep stall and then to maintain control in all axes.

It should be understood that the aircraft in FIGS. 1-6 are by way of illustration and example and are not to be taken as a limitation to the spirit and applications of this invention. For example, the aircraft engines may be of any type, e.g., jet, propeller or reaction motors. Also, the high velocity flow of air from the engine may be released aft of the stabilizer surface rather than forward as illustrated in FIGS. 1-6. Additionally, the airplane may be of either high wing or low wing design and conventional elevator flaps may be used with the stabilizer 20 of FIG. 1 for conventional flight maneuvers.

What is claimed is:

1. A method for controlling the stalled descent of a generally conventional airplane having a fuselage with nose and tail, a fixed wing as the primary lifting surface, a rudder at the tail for yaw control, a power system for generating forward thrust substantially parallel to the longitudinal axis of said fuselage, and a generally planar fully tiltable stabilizer surface at said tail for pitch control, comprising the steps of:

reducing the airspeed of said airplane in substantially level flight and tilting said stabilizer surface, leading edge downward, to produce near stall conditions on said primary lifting surface;

further tilting said stabilizer surface with leading edge downward to induce stalling of said primary lifting surface;

further tilting said stabilizer with leading edge downward at an extreme angle of approximately 65° to 80° with respect to said longitudinal axis of said fuselage to produce deep stall of said primary lifting surface;

increasing said thrust of said power system to orient said axis of said fuselage above the horizontal with said nose higher than said tail; and varying said engine thrust to control the rate of descent, said rate of descent being arrested when said thrust is increased and said rate of descent being accelerated when said thrust is decreased.

2. A method for controlling the stalled descent of a generally conventional airplane having a fuselage with nose and tail, a fixed wing as the primary lifting surface, a rudder at the tail for yaw control, a stabilizer surface with spoilers at said tail for pitch control, and a tiltable power system producing forward thrust substantially parallel to the longitudinal axis of said fuselage during conventional flight and producing upward thrust at an extreme angle to said axis of said fuselage during stalled descent, comprising the steps of:

reducing the airspeed of said airplane in substantially level flight and operating said stabilizer surface to produce near stall conditions on said primary lifting surface;

further operating said stabilizer surface to induce stalling of said primary lifting surface;

actuating said spoilers on said stabilizer surface to produce deep stall of said stabilizer surface and said primary lifting surface whereby descent of said airplane initiates;

tilting said power system at said extreme angle to said axis of said fuselage to generate upward thrust;

varying said upward thrust of said power system to orient said axis of said fuselage above the horizontal with said nose higher than said tail; and varying said upward thrust to control the rate of descent, said rate of descent being arrested when said thrust is increased and said rate of descent being accelerated when said thrust is decreased.

3. The method of claim 2 wherein said extreme angle of said power system is approximately 80°.

4. The method of claim 2 wherein said power system comprises a pair of engines mounted at opposite wing tips of said fixed wing.

5. A method for controlling the flight of a generally conventional airplane having a fuselage with nose and tail, a fixed wing as the primary lifting surface, a rudder at the tail for yaw control, a power system for generating forward thrust substantially parallel to the longitudinal axis of said fuselage, and a generally planar fully tiltable, by rotation about a transverse horizontal axis, stabilizer surface at said tail for pitch control, comprising the steps of:

- tilting said stabilizer surface, leading edge downward relative to said longitudinal axis of said fuselage, until the angle of said primary lifting surface relative to the oncoming air flow is positively increased to approach stalling;
- further tilting said stabilizer surface with leading edge downward relative to said longitudinal axis of said fuselage, until the angle of said primary lifting surface relative to said oncoming air flow is further positively increased and stall of said primary lifting surface is induced;
- further tilting said stabilizer with leading edge downward at an extreme angle of approximately 65° to 80° relative to said longitudinal axis of said fuselage, until the angle of said primary lifting surface relative to said oncoming air flow is positively increased such that substantial flow line separation occurs along said primary lifting surface causing deep stall of said primary lifting surface;
- varying said engine thrust whereby the attitude and flight path of said airplane is controlled during deep stall of said primary lifting surface.

* * * * *